United States Patent [19]

Kim

[11] 4,132,762

[45] Jan. 2, 1979

[54] HYDROGEN PEROXIDE STABILIZATION

[75] Inventor: Leo Kim, Houston, Tex.

[73] Assignee: Shell Oil Company, Houston, Tex.

[21] Appl. No.: 847,272

[22] Filed: Oct. 31, 1977

[51] Int. Cl.$^2$ ............................................. C01B 15/02
[52] U.S. Cl. ..................................... 423/272; 423/584
[58] Field of Search ................................. 423/272, 584

[56] References Cited

U.S. PATENT DOCUMENTS 4,007,256   2/1977   Kim et al. ............................ 423/584

*Primary Examiner*—O. R. Vertiz
*Assistant Examiner*—Wayne A. Langel

[57] ABSTRACT

Hydrogen peroxide in aqueous solution is stabilized against decomposition due to transition metal impurities by a synergistic combination of sulfonic acid type ion exchange resin and acetonitrile.

8 Claims, No Drawings

HYDROGEN PEROXIDE STABILIZATION

BACKGROUND OF THE INVENTION

1. Field of the Invention

This invention relates to a method of stabilizing hydrogen peroxide solutions using strong acid ion exchange resins and acetonitrile.

2. Description of the Prior Art

It has long been known that small concentrations of transition metal ions such as those of iron, copper, nickel, lead, chromium or manganese in a hydrogen peroxide solution cause the hydrogen peroxide to decompose. This can be quite troublesome in the manufacture and storage of hydrogen peroxide. The materials of construction used in commercial hydrogen peroxide units make it virtually impossible to exclude all traces of transition metal ions from the process streams and the product hydrogen peroxide solutions. Methods of slowing down or stopping the decomposition of hydrogen peroxide in the presence of transition metal ions would be quite useful industrially.

Several methods have been proposed for stabilizing hydrogen peroxide solutions. U.S. Pat. No. 2,676,923 issued Apr. 27, 1954 to Young disclosed the use of acid ion exchange resins to remove heavy metal impurities thereby slowing down decomposition and providing a stabilized solution. Young used fixed beds of ion exchange resins through which the hydrogen peroxide solution were passed in order to remove the metal ions. U.S. Pat. No. 3,074,782 issued Jan. 22, 1963 to Meeker et al also disclosed the use of ion exchange resins to purify hydrogen peroxide streams.

Applicant in copending application Ser. No. 847,273, filed Oct. 31, 1977, has disclosed the use of acetonitrile to stabilize hydrogen peroxide solutions. It has been found that when a strong acid ion exchange resin and acetonitrile are combined and used to stabilize hydrogen peroxide solutions, an improvement greater than merely additive is found, the two combined provide a synergistic stabilization effect.

SUMMARY OF THE INVENTION

This invention provides a method for stabilizing hydrogen peroxide solutions against decomposition caused by transition metal ions. Stabilized hydrogen peroxide solutions will show significantly less decomposition of the hydrogen peroxide for a given period of time than will unstabilized solutions. The method of this invention utilizes a combination of strong acid ion exchange resin and acetonitrile as a stabilizing agent.

DESCRIPTION OF THE PREFERRED EMBODIMENTS

The hydrogen peroxide solutions stabilized by the method of this invention will contain less than 30% hydrogen peroxide. The use of solutions having concentrations greater than 30% hydrogen peroxide can lead to explosive mixtures.

The acid ion exchange resins utilized in the composition of this inventon are well known in the art and are readily available commercially. These are in the gel form or are macroporous and are strongly acidic. They are present in substantially the acid form. The strong acid resins typically have base resins of cross-linked styrene, styrene-divinyl benzene, phenol-formaldehyde, benzene-formaldehyde, methylmethacrylate, divinyl benzene-methylmethacrylate having functional sulfonic acid groups attached thereto. The preferred resins are the styrene-divinyl benzene resins. Representative examples of commercial ion exchange resins useful in the method of this invention are shown in Table I.

TABLE I

| Type and Exchange Group | Bio-Rad Analytical Grade Ion Exchange Resins | Dow Chem. Company "Dowex" | Diamond-Shamrock "Duolite" |
|---|---|---|---|
| Strong Acidic Phenolic $R-CH_2SO^-_3\,H^+$ | Bio-Rex 40 | | C-3 |
| Strong Acidic, polystyrene $\phi-SO^-_3\,H^+$ | AG 50W-X1 | 50W-X1 | |
| | AG 50W-X2 | 50W-X2 | |
| | AG 50W-X4 | 50W-X4 | |
| | AG 50W-X8 | 50W-X8 | C-20 |
| | AG50W-X10 | 50W-X10 | C-20X10 |
| | AG 50W-X12 | 50W-X12 | |
| | AG 50W-X16 | 50W-X16 | |
| Macroporous | AG MP-50 | MSC-1 | C-25D |
| Type and Exchange Group | Rohm & Haas Co. "Amberlite" | Permutit Company (England) | Permutit Company (U.S.A.) |
| Strong Acidic, phenolic $R-CH_2SO^-_3\,H^+$ | | Zeocarb 215 | |
| Strong Acidic, polystyrene $\phi-SO^-_3\,H^+$ | IR-116 | | |
| | IR-118 | Zeocarb 225 (X4) | |
| | IR-120 | Zeocarb 225 | Permutit Q |
| | CG-120 | | |
| | IR-122 | | Q-100 |
| | IR-124 | | Q-130 |
| | XN1010 | | |
| | XN1011 | | |
| Macroporous | 200 | | |

The number of grams of resin utilized in the method of this invention will depend on the number of sulfonic acid groups available, i.e., on the exchange capacity of the resin customarily measured as milliequivalents per gram (dry) of the resin (meq/g). Typical exchange capacities of commercial resins are MSC-1 1.6, XN1010 3.3, Bio-Rex 40 2.9 and AG 50W-X1 5.0 meq/g. The amount of resin required will be greater than 0.001 meq per milliliter (ml) of total stabilized solution and preferably greater than 0.01 meq/ml of total solution. The maximum amount of resin used is determined by economic consideration, i.e., large amounts of resin are effective but the cost-effectiveness ratio becomes prohibitively large with very large amounts of resin. Thus a preferred amount of ion exchange resin will be used that has an ion exchange capacity ranging from about 0.001 to about 0.05 and most preferably from about 0.01 to about 0.05 meq/ml of total solution.

The acetonitrile to be added to the hydrogen peroxide solution may be used neat or admixed with water. The amount of acetonitrile required will be greater than about 0.001 and preferably greater than about 0.01 milliliters of acetonitrile per milliliter of total solution. The maximum amount of acetonitrile used is determined by economic considerations, i.e., large amounts of acetonitrile is operative but the cost-effectiveness ratio becomes prohibitively large with large amounts of acetonitrile. The preferred amount of acetonitrile utilized ranges from about 0.001 to about 1 and preferably from about 0.01 to about 0.1 milliliters of acetonitrile per milliliter of total solution.

This invention is also directed to stabilized hydrogen peroxide compositions. These will contain less 30 percent by volume of the liquid present of hydrogen peroxide, more than 0.1 and preferably more than 1 percent by volume of the liquid present of acetonitrile with the balance of the liquid being present being water and with the liquid of the composition being in contact with more than 0.001, preferably more than about 0.01 milliequivalents of an acid ion exchange resin per milliter of total solution.

This invention will be further described by the following illustrative embodiments which are provided for illustration and are not to be construed as limiting the invention.

ILLUSTRATIVE EMBODIMENTS

Example 1

Into a 50 ml flask was placed 10 ml of 20% hydrogen peroxide and 1 ml of a solution made from 0.15g $FeSO_4$ in 100 ml water. Ferric sulfate titration indicated that just after the addition of the iron solution 17.27% $H_2O_2$ was present. After 10 minutes at room temperature 15.22% $H_2O_2$ was present (88.1% of original amount). After 60 minutes at room temperature 4.98% $H_2O_2$ was found (28.8% of original amount).

Example 2

The above procedure was repeated except that 0.1g of Rohm and Haas XN1010 $H^+$ ion exchange resin (macroreticular sulfonated styrene-divinyl benzene, hydrogen form) was added. Initial $H_2O_2$ titration indicated 15.50% was present and after 60 minutes 14.50% was present (93.5% of original amount).

Example 3

Example 1 was repeated adding 0.5 ml acetonitrile. From an initial 16.28% $H_2O_2$ solution, 13.86% $H_2O_2$ was detected after 60 minutes (85.1% of original amount).

Example 4

Example 1 was repeated but both 0.1g XN1010$H^+$ and 0.5 ml acetonitrile was added to the $H_2O_2$ solution. Initial $H_2O_2$ was 18.85% and after 60 minutes 18.60% was present (98.7% of original amount).

Example 5

Example 2 was repeated except that 0.2g XN1010$H^+$ (double amount in Example 2) was used. An initial 24.79% $H_2O_2$ solution dropped to 22.98% $H_2O_2$ after 60 minutes (92.7% of original amount).

Example 6

Example 3 was repeated except that 1 ml acetonitrile (double amount in Example 3) was used. An initial 26.86% $H_2O_2$ solution dropped to 23.59% $H_2O_2$ in 60 minutes (87.8% of original amount).

Example 7

Example 1 was repeated using 0.15g $Cu(NO_3)_2$ in place of $FeSO_4$. Initial $H_2O_2$ concentration was 18.75%. After 60 minutes the $H_2O_2$ concentration was found to be 14.81% (79.0% of original amount).

Example 8

Example 7 was repeated adding 0.5 ml acetonitrile. Initial $H_2O_2$ concentration was 19.83%. After 60 minutes 18.98% was found (95.7% of original amount).

Example 9

Example 7 was repeated using 0.1g XN1010 $H^+$ resin. Initial $H_2O_2$ concentration was 19.63%. After 60 minutes 18.73% $H_2O_2$ was found (95.4% of original amount).

Example 10

Example 7 was repeated but both 0.5 ml acetonitrile and 0.1g XN1010 $H^+$ resin were added. Initial $H_2O_2$ concentration was 18.72%. After 60 minutes no loss of $H_2O_2$ was detected (100% of original amount).

What is claimed is:

1. A method of stabilizing an aqueous hydrogen peroxide solution against decomposition caused by transition metals, said solution having up to about thirty percent by weight of hydrogen peroxide, which comprises adding to the solution more than about 0.001 milliliters of acetonitrile per milliliter of total solution and more than 0.001 milliequivalents of an acid ion exchange resin per milliliter of total solution.

2. The method of claim 1 wherein the resin is a sulfonated styrene-divinylbenzene resin.

3. The method of claim 1 wherein the acetonitrile is more than about 0.01 milliliters per milliliter of total solution and the resin is more than about 0.01 milliequivalents per milliliter of total solution.

4. The method of claim 3 wherein the resin is a sulfonated styrene-divinylbenzene resin.

5. A composition comprising an aqueous hydrogen peroxide solution containing up to about thirty percent by weight of hydrogen peroxide and more than 0.001 milliliters of acetonitrile per milliliter of total solution and in contact with more than about 0.001 milliequivalents of an acid ion exchange resin per milliliter of total solution.

6. The composition of claim 5 wherein the resin is a sulfonated styrene-divinylbenzene resin.

7. The composition of claim 5 wherein the acetonitrile is more than about 0.01 milliliters per milliliter of total solution and the resin is more than about 0.001 milliequivalents per milliliter of total solution.

8. The composition of claim 7 wherein the resin is a sulfonated styrene-divinylbenzene resin.

* * * * *